United States Patent [19]

Marquot

[11] Patent Number: 4,864,541
[45] Date of Patent: Sep. 5, 1989

[54] INTEGRATED CIRCUIT OF THE LOGIC CIRCUIT TYPE COMPRISING AN ELECTRICALLY PROGRAMMABLE NON-VOLATILE MEMORY

[75] Inventor: Alexis Marquot, St Maximin, France

[73] Assignee: Thomson Composants Militaires & Spaciaux, Paris, France

[21] Appl. No.: 102,554

[22] Filed: Sep. 29, 1987

[30] Foreign Application Priority Data

Sep. 30, 1986 [FR] France .............................. 86 13576

[51] Int. Cl.⁴ ............................................ G11C 11/34
[52] U.S. Cl. ...................................... 365/185; 365/228; 365/195
[58] Field of Search ............... 365/228, 226, 195, 185, 365/104

[56]         References Cited
        U.S. PATENT DOCUMENTS

| | | | |
|---|---|---|---|
| 4,321,489 | 3/1982 | Higuchi et al. ................. | 365/226 X |
| 4,366,560 | 12/1982 | McDermott et al. .............. | 365/228 |
| 4,439,804 | 3/1984 | Riddle et al. .................... | 365/189 X |
| 4,649,521 | 3/1987 | Tsuchida et al. .................. | 365/185 |

FOREIGN PATENT DOCUMENTS

| | | | |
|---|---|---|---|
| 0053273 | 6/1982 | European Pat. Off. . | |
| 0205895 | 12/1982 | Japan .................................. | 365/104 |
| 0005493 | 1/1984 | Japan .................................. | 365/104 |
| 0036393 | 2/1984 | Japan .................................. | 365/104 |
| 0010497 | 1/1985 | Japan .................................. | 365/104 |

OTHER PUBLICATIONS

1980 IEEE International Solid-State Circuits Conference, 13 Fev 1980, pp. 58-59, IEEE, New York, U.S.; A. C. Graham et al.: "Battery Backup Circuits for Memories".

Primary Examiner—Stuart N. Hecker
Assistant Examiner—Andrew L. Sniezek
Attorney, Agent, or Firm—Oblon, Spivak, McClelland, Maier & Neustadt

[57]                ABSTRACT

An integrated circuit of the logic circuit type comprises an electrically programmable non-volatile memory formed by a matrix of memory cells of the floating-gate transistor type, with read and write circuits handling the interconnection of these circuits with the memory, the integrated circuit receiving a general power voltage $V_{CC}$ and a programming voltage $V_{pp}$ which are different from one another. The circuit can also detect the main power voltage $V_{CC}$, sending a signal to prohibit writing in the memory when it is observed that the power voltage $V_{CC}$ is at zero or in high impedance while the programming voltage is present.

2 Claims, 1 Drawing Sheet

U.S. Patent     Sep. 5, 1989     4,864,541
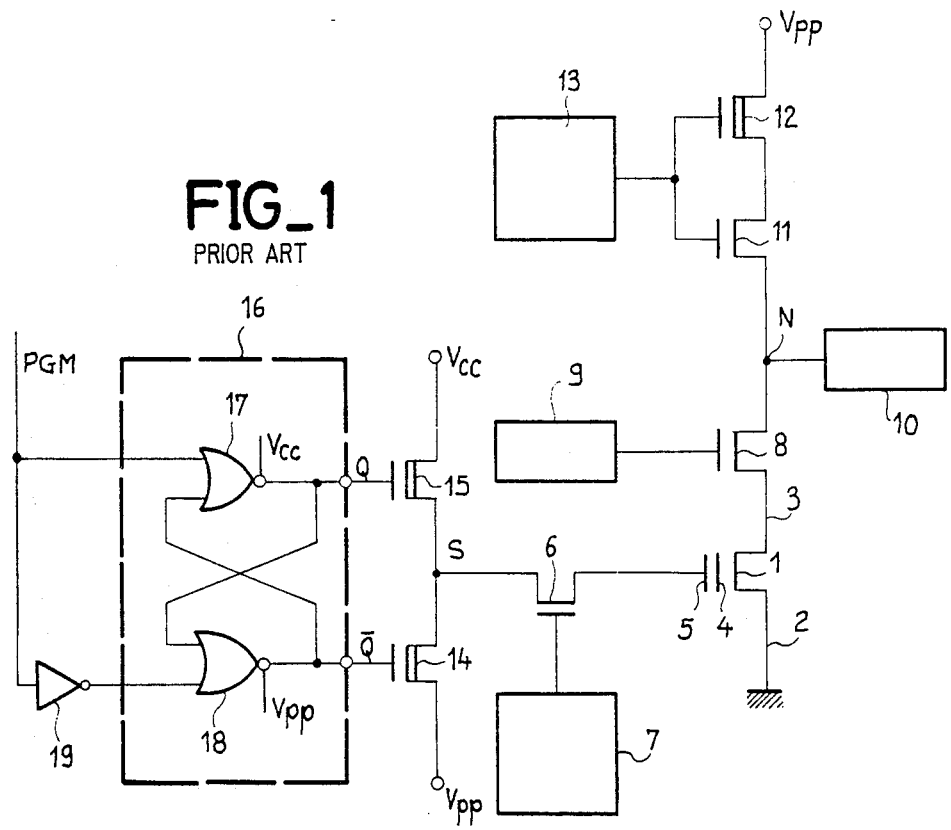
FIG_1
PRIOR ART
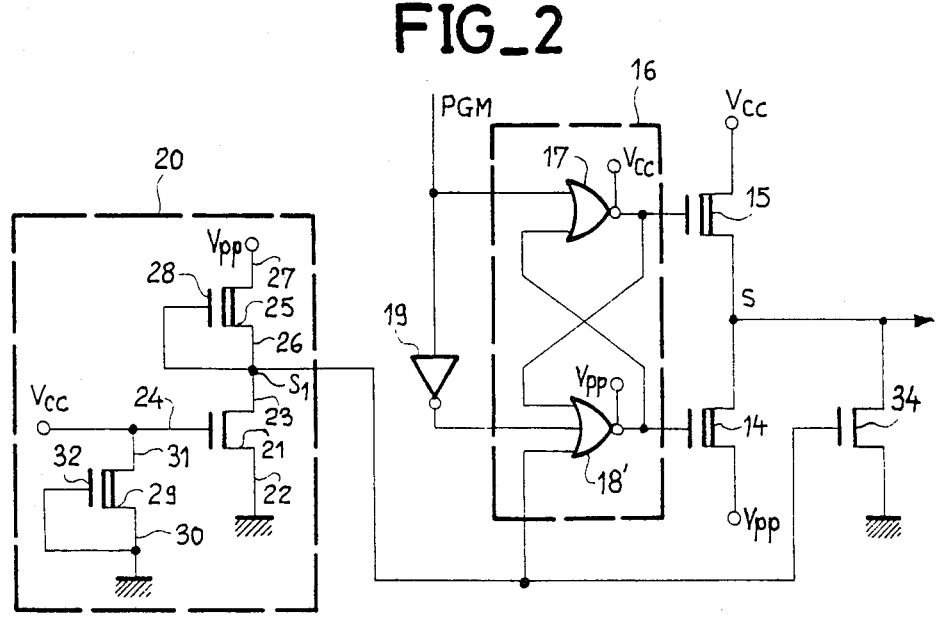
FIG_2

INTEGRATED CIRCUIT OF THE LOGIC CIRCUIT TYPE COMPRISING AN ELECTRICALLY PROGRAMMABLE NON-VOLATILE MEMORY

BACKGROUND OF THE INVENTION

1. Field of the Invention

The present invention pertains to an integrated circuit of the logic circuit type comprising an electrically programmable non-volatile memory. It pertains more especially to an integrated circuit in which the electrically programmable non-volatile memory consists of an EPROM or EEPROM type memory. Circuits of this type are used, for example, in memory cards also known as CCC cards. In this case, non-volatile memories are most usually intended to take non-falsifiable confidential information.

2. Description of the Prior Art

Now, in memories of the EPROM or EEPROM type presently available in the market, each data storage element or memory cell comprises a floating gate MOS transistor. This type of transistor may have two states. Thus, for an N-channel MOS transistor, in a first state, no charge is trapped at the floating gate. There may be a conduction channel between the source and the drain. The transistor is then conductive and behaves like a closed switch. In a second state, the electrons have been trapped at the floating gate. They prevent the creation of a conduction channel in the substrate between the source and the drain. In this case, the transistor is off and behaves like an open switch.

To program or read a floating-gate MOS transistor, different voltages have to be applied to the various electrodes of the transistor. These voltages are applied by means of specific circuits. Thus, as shown in FIG. 1 which pertains to an EPROM memory, the memory cell 1 of which consists of a SAMOS (stacked gate avalanche injection MOS) type floating-gate transistor, each floating-gate transistor 1 has two main electrodes, 2 and 3 respectively, and one control gate 5 stacked on the floating gate 4. In the case of a memory, the floating-gate transistors 1 constituting the memory cells are connected in matrix form. Thus, a first main electrode 2 or source, in the technology used, is connected to earth while the other electrode 3 or drain is connected by a bit line (not shown) and a MOS transistor forming a switch 8 to a column address decoder 9. The control gate 5 is connected by another so-called word line (not shown) to a row address decoder 7. More specifically, the column address decoder 9 is connected to the gate of the transistor 8, the source of which is connected to the electrode 3 of the floating-gate MOS transistor 1, while its other electrode or drain is connected by means of a load line, comprising MOS transistors 11 and 12, to the programming voltage $V_{pp}$. The load line consists of a depleted MOS transistor 12, which has its drain connected to $V_{pp}$ and its source connected to the drain of an enhanced MOS transistor 11, both gates of the transistors 11 and 12 being connected together and to a write control circuit 13. Furthermore, the node N between the source of the MOS transistor 11 and the drain of the MOS transistor 8 is connected to a read amplifier shown by the block 10.

Similarly, the row address decoder 7 is connected to the gate of the switching MOS transistor 6, which has one of its main electrodes connected to the control gate 5 of the floating-gate MOS transistor 1 while its other main electrode is connected to the output of a voltage switch-over circuit.

As shown in FIG. 1, the voltage change-over circuit essentially comprises two depleted MOS transistors 14 and 15, mounted between the power voltage $V_{CC}$ and the programming voltage $V_{pp}$. More specifically, the drain of the depleted transistor 14 is connected to $V_{pp}$. Its source is connected to the source of the depleted transistor 15, the drain of which is connected to $V_{CC}$. The output of the change-over circuit is set at the midpoint S between the two depleted MOS transistors 14 and 15. Furthermore, the gates of the two depleted MOS transistors 14 and 15 are respectively connected to the outputs Q and $\overline{Q}$ of a R-S flip-flop 16. This flip-flop 16 is made with two gates NI 17 and 18 which are intercoupled, namely one of the inputs of the NOR gate 17 is connected to the output of the NOR gate 18 and one of the inputs of the NOR gate 18 is connected to the output of the NOR gate 17. Furthermore, the NOR gate 17 is powered by the power voltage $V_{CC}$ while the NOR gate 18 is powered by the programming voltage $V_{pp}$. The other inputs of the gates NI 17 and 18 are respectively connected to the programming control signal PGM and also to the programming control signal $\overline{PGM}$ obtained at the output of the inverter 19. During the programming of a memory cell of the type shown in FIG. 1, the signal $\overline{PGM}$ is at the logic level "1". Consequently, the outputs of the R-S flip-flop 16 are respectively at "0" and "1". As a result, the signal at the output S is at the logic level $V_{pp}$. Thus, when the memory cell 1 is selected by means of the decoders 7 and 9, its control gate 5 receives a programming voltage equal to $V_{pp}$. Furthermore, depending on whether the input datum at the write circuit 13 is "1" or "0", the MOS transistors 11 and 12 constituting the load line, are respectively on or off, and the drain of the floating-gate MOS transistor 1 receives a voltage which is substantially equal to $V_{pp}$ or is floating. With the above circuits, it has been observed experimentally that if pulses are sent to the power terminals of the programming voltage $V_{pp}$, while the circuit is not powered by $V_{CC}$, the non-volatile memory can be programmed randomly in any of its zones, because the protection circuits generally associated with these memories are then out of service. This is particularly troublesome when certain zones of the non-volatile memory have to receive confidential information, the writing of which is strictly monitored and controlled, and when access can be had to these memories by external connections, which is the case with memory cards.

For, in memory cards, the integrated circuit of the logic circuit type comprising the electrically programmable volatile memory, is set in a support known as the card, and electrical connection terminals are accessible at the surface so that the operations can be performed with the card in a terminal. Consequently, the power voltage $V_{CC}$ and the programming voltage $V_{pp}$ are accessible through connections which may be defective, resulting in poor powering of the card and the possibility of random programming.

3. Summary of the Invention

The present invention is therefore aimed at removing the above disadvantages, and an object of the invention is a logic circuit type of integrated circuit comprising an electrically programmable non-volatile memory formed by a matrix of memory cells of the floating-gate transistor type, with read and write circuits and means that handle the interconnection of the circuits with the memory, the circuit receiving a general power voltage $V_{CC}$ and a programming voltage $V_{pp}$, these two voltages being different, a circuit further comprising means to detect the main power voltage $V_{CC}$, sending a signal to prohibit write operations in the memory when it is observed that the power voltage $V_{CC}$ is at "0" or in high impedance while the programming voltage $V_{pp}$ is present.

According to a preferred embodiment, the detection means comprise an inverter having a signal transistor of the MOS type, with its gate connected to the power voltage $V_{CC}$ and a load connected to the programming voltage $V_{pp}$, the inverter delivering a logic signal "0" when the power voltage $V_{CC}$ is re-established and a logic signal "1" in the other cases.

Preferably, the load comprises a depleted MOS transistor, with its gate connected to one of the main electrodes, and the signal transistor comprises an enriched MOS transistor.

According to another characteristic of the present invention, the detection means further comprise a load mounted between the gate of the signal transistor and earth so as to place the gate-source voltage of the signal transistor at earth when the power voltage $V_{CC}$ is in high impedance.

In this case, the load constitutes a depleted MOS transistor which has its gate connected to the source.

According to another characteristic of the present invention, if the detection circuit is to function for power voltages $V_{CC}$ which are acceptable to the memory, the threshold voltage $V_T$ of the signal transistor is chosen in such a way that $V_T$ is substantially equal to $V_{CC}$ min.

According to another characteristic of the present invention, the output of the detection means is connected by a gate to a part of the programming circuit, so as to block the voltage $V_{pp}$ when the power voltage $V_{CC}$ is at "0" or in high impedance.

DESCRIPTION OF THE DRAWINGS

Other characteristics and advantages of the present invention will emerge from the following description of an embodiment, made with reference to the appended drawings of which:

FIG. 1, already described, is a schematic drawing, showing an integrated circuit comprising an electrically programmable non-volatile memory to which the present invention can be applied.

FIG. 2 is a schematic drawing, showing a detection circuit according to the present invention and means for connection with the integrated circuit of FIG. 1.

DESCRIPTION OF THE EMBODIMENTS

To simplify the description, the same elements bear the same references in the FIGS. Furthermore we refer, in the description, to an EPROM memory, the memory cell of which consists of a floating-gate MOS transistor of the SAMOS type, made with NMOS technology. However, it is clear to the specialist that the present invention can apply to other types of electrically programmable non-volatile memories which require a programming voltage different from the general power voltage and which are made with other technologies.

As shown in FIG. 2, the detection means 20 according to the present invention comprise essentially a signal MOS transistor 21 consisting of an enhanced MOS transistor, with one of its electrodes, namely the source 22 in the technology used, connected to earth and with its other electrode 23, namely the drain, connected to a load which shall be described further below. The gate 24 of this MOS transistor is connected to the general power voltage $V_{CC}$. According to a special characteristic of the present invention, the integrated circuit comprising these detection means should be capable of functioning for power voltages $V_{CC}$ which are greater than a certain power voltage of $V_{CC}$ min. Consequently, the enhanced MOS transistor 21 has been made so as to display a threshold voltage $V_T$ which is substantially equal to the power voltage $V_{CC}$ min. By using an enhanced MOS transistor with a specific threshold voltage, the passage of the voltage $V_{CC}$ above the threshold voltage can be detected in a sure way.

Furthermore, according to the preferred embodiment of the present invention shown in FIG. 2, the load consists of a depleted MOS transistor 25. The source 26 of this MOS transistor is connected to the drain 23 of the signal MOS transistor 21, and its drain 27 is connected to the programming voltage $V_{pp}$. In a known way, its gate 28 is connected to its source 26 in such a way that the voltage $V_{GS}$ equals "0". The output S1 of the detection circuit is taken at the mid-point between the electrodes 26 and 23.

According to an additional characteristic of the present invention, a load is connected between the gate 24 of the signal MOS transistor 21 and the earth. This load is formed by a depleted MOS transistor 29, the source 30 of which is connected to earth, and the drain 31 of which is connected to the gate 24 of the transistor 21. The gate 32 of the transistor 29 is connected to its source 30. This load draws the gate 24 voltage $V_{CC}$ towards 0 when $V_{CC}$ is in high impedance.

We shall now explain the working of the detection circuit 20 shown in FIG. 2. So long as the voltage $V_{CC}$ is below $V_{CC}$ min, the signal transistor 21 is off and the transistor 25 works in the triode mode. The output S1 hence delivers a logic signal "1" corresponding to $V_{pp}$. For a voltage $V_{CC}$ greater than $V_{CC}$ min, the signal transistor 21 goes into the triode mode and the transistor 25 into the saturated mode, and a signal is obtained at the output S1, corresponding to a logic signal "0".

Furthermore, the output logic signal S1 of the detection circuit 20 according to the present invention is sent to a part of the integrated circuit, more especially to a part of the programming circuit, so as to block the programming voltage $V_{pp}$, when the power voltage $V_{CC}$ is at "0" or in high impedance. For example, as shown in FIG. 2, this logic signal can be sent to the change-over circuit which changes over from the programming voltage $V_{pp}$ to the power voltage $V_{CC}$: the said circuit powers the control gates of the floating-gate MOS transistors 1 constituting the memory cells of the EPROM memory. This change-over circuit is identical to the change-over circuit described with reference to FIG. 1. It shall not be described again herein. However, as shown in FIG. 2, the output signal S1 is sent to an input of the NOR gate 18' which corresponds to the NOR gate 18, except that is three-input gate and not a two-input gate. When the signal S1 is at the logic level "1", the NOR gate 18' is off, and it is no longer possible to obtain $V_{pp}$ at the level of the output S. Furthermore, as shown in FIG. 2, an enhanced MOS transistor 34 is mounted between the output S and earth. The gate of this MOS transistor 34 is connected to the output S1. Thus, when the output S1 is at the logic level 1, the MOS transistor 34 brings the output S to the logic level "0".

The advantage of the circuit described above is that it prevents any random programming of an electrically programmable non-volatile memory intended chiefly to receive confidential information, and that it does so when used outside normal power voltage conditions. Furthermore, this circuit is very simple in design, takes up little space and works very dependably.

It is clear to the specialist that the present invention can be applied to any integrated circuit comprising memories for which the programming of a memory cell is done in the same way as with floating-gate transistor type EPROMs or EPPROMs, where the power voltage terminals are easily accessible from the outside.

What is claimed is:

1. An integrated circuit comprising:

an electrically programmable non-volatile memory formed by a matrix of memory cells, each cell comprising a floating gate transistor, means for supplying a first supply voltage $V_{CC}$ having a first value, said first voltage being used for powering logic circuits in said circuit, means for supplying a second supply voltage $V_{pp}$ having a second value substantially higher than said first value, said second voltage being used for supplying programming pulses for programming the memory cells, said integrated circuit further comprising;

detecting means for detecting the presence of said first voltage, said detecting means capable of producing an inhibiting signal when said second voltage is present and said first voltage has not a proper value, said inhibiting signal being used for prohibiting any transmission of a programming pulse to a memory cell, wherein said detecting means comprise an inverter having a serial arrangement of an input transistor and a first resistive transistor, said input transistor having a gate connected to said first voltage supply means and said serial arrangement being connected between said second voltage supply means and a ground, said detecting means further comprising a second resistive load transistor connected to the gate of said input transistor for automatically discharging to ground the gate of said input transistor in case the first supply voltage means is in a high impedance state.

2. An integrated circuit according to claim 1, wherein, said second resistive load transistor is a depleted transistor having its gate connected to its source.

* * * * *